(12) United States Patent
Ichikawa et al.

(10) Patent No.: US 7,971,729 B2
(45) Date of Patent: Jul. 5, 2011

(54) SEPARATION MEMBRANE COMPLEX, AND METHOD FOR MANUFACTURING THE SEPARATION MEMBRANE COMPLEX

(75) Inventors: Akimasa Ichikawa, Nagoya (JP); Hisayoshi Nonaka, Nagoya (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 12/629,409

(22) Filed: Dec. 2, 2009

(65) Prior Publication Data

US 2010/0072127 A1    Mar. 25, 2010

Related U.S. Application Data

(63) Continuation of application No. PCT/JP2008/062117, filed on Jun. 27, 2008.

(30) Foreign Application Priority Data

Jun. 27, 2007  (JP) .................................. 2007-169001

(51) Int. Cl.
  B01D 69/12  (2006.01)
  B01D 71/02  (2006.01)
  B01D 71/06  (2006.01)
  B01D 67/00  (2006.01)
  B01D 61/36  (2006.01)
  B01D 29/05  (2006.01)

(52) U.S. Cl. ........ 210/490; 210/483; 210/488; 210/503; 210/504; 210/505; 210/506; 210/509; 210/510.1; 502/401; 502/402; 502/405

(58) Field of Classification Search .................. 210/483, 210/488, 490, 502.1, 503, 504, 505, 506, 210/509, 510.1; 502/401, 402, 405
See application file for complete search history.

(56) References Cited

U.S. PATENT DOCUMENTS

| 4,077,885 A | 3/1978 | van Heuven et al. |
| 6,037,292 A * | 3/2000 | Lai et al. ........................ 502/60 |
| 2004/0182242 A1 | 9/2004 | Mitani et al. |
| 2006/0288677 A1 | 12/2006 | Kaigawa et al. |
| 2008/0105613 A1 | 5/2008 | Ichikawa et al. |
| 2009/0220414 A1 | 9/2009 | Mizuno |

FOREIGN PATENT DOCUMENTS

| JP | 51-087179 A1 | 7/1976 |
| JP | 02-229529 A1 | 9/1990 |
| JP | 11-033322 A1 | 2/1999 |
| JP | 2002-066280 A1 | 3/2002 |
| JP | 2002-293656 A1 | 10/2002 |
| JP | 2004-275858 A1 | 10/2004 |
| JP | 3647985 B2 | 2/2005 |
| JP | 2006-212480 | 8/2006 |
| WO | 2005/087355 A1 | 9/2005 |
| WO | 2007/029464 A1 | 3/2007 |
| WO | 2008/010452 A1 | 1/2008 |
| WO | 2008/056542 A1 | 5/2008 |

* cited by examiner

Primary Examiner — John Kim
(74) Attorney, Agent, or Firm — Burr & Brown

(57) ABSTRACT

A separation membrane complex where a carbon membrane is formed directly on a porous body (surface layer) and an intermediate layer has a thickness of 10 to 100 μm can be used as a filter having improved flux and selectivity in comparison with a conventional one.

10 Claims, 4 Drawing Sheets

SEPARATION MEMBRANE COMPLEX, AND METHOD FOR MANUFACTURING THE SEPARATION MEMBRANE COMPLEX

TECHNICAL FIELD

The present invention relates to a separation membrane complex which is a complex having a porous body and a separation membrane formed on a surface of the porous body and a method for manufacturing the separation membrane complex.

BACKGROUND OF THE INVENTION

There is a technical desire to selectively separate a specific substance (gas or the like) from a mixture of a plurality of substances (gas or the like) at a molecular level, and, as a filter responding to the desire, there are generally known ones each employing polysulfone, silicon, polyamide, polyimide, or the like as a separation membrane.

However, since these have separation membrane made of polymer resin, these inherently have a problem that target substance for separation is limited because the membrane is easily altered and deteriorated when an organic solvent is contained in the mixture serving as the target substance for separation.

Therefore, in recent years, as a filter excellent in chemical stability and thermal resistance, a complex where a carbon membrane as a separation membrane is formed on a porous body (a porous substrate) had been proposed.

For example, in Patent Document 1, there is proposed a molecular sieve carbon membrane having a carbon content of 80% or more, presenting a large number of pores having a pore diameter of 1 nm or less, and adhering to a surface of a coating layer of silica sol, alumina sol or the like formed on a surface of a ceramic porous body having a porosity of 30 to 80%. This molecular sieve carbon membrane can be obtained by applying a liquid thermosetting resin (phenol resin) to form a polymer membrane, followed by a thermal treatment at 550 to 1100° C. under a non-oxidizing atmosphere.

FIG. 3 is a schematic view showing a cross section of such a molecular sieve carbon membrane (separation membrane complex). The molecular sieve carbon membrane 3 shown in FIG. 3 has a porous body 31 and a carbon membrane 36 formed on a surface of the porous body 31, and a sol layer 35 (a coating layer) of a silica sol, alumina sol, or the like is formed on the surface of the porous body 31, with a carbon membrane 36 adhering to the sol layer 35.

Patent Document 1: JP-B-3647985

SUMMARY OF THE INVENTION

However, when a filter was actually manufactured by forming a carbon membrane on a surface of a (ceramic) porous body, it was not satisfied especially in flux (permeation flux) and selectivity (separation coefficient α), and the need of improvement was felt.

In addition, it was found that, in a method where the surface of the porous body (porous substrate) is impregnated with a silica sol, followed by forming a carbon membrane thereon, as disclosed in the Patent Document 1, since the pore diameter of the carbon membrane increases due to the formation of the sol layer, though selectivity improves regarding a part of substances (gas or the like) having a relatively large molecular weight with a molecular diameter of 0.43 nm or more such as $C_3H_8/C_3H_6$, selectivity easily deteriorates regarding other systems having a relatively small molecular weight such as $CO_2/CH_4$, $N_2/O_2$, and water/EtOH having high industrial usability. In addition, it was also confirmed that it has low flux by the influence of pressure loss due to the silica sol.

The present invention has been made in view of the aforementioned circumstances and aims to provide a means for obtaining a filter where a separation membrane (e.g., carbon membrane) is formed on a porous body and where flux (permeation flux) and selectivity are improved in comparison with a conventional one. As a result of a repeated study, it was found out that the aforementioned problems can be solved by specifying the thickness and roughness of the layer constituting the separation membrane complex (capable of being used as a filter), which led to the completion of the present invention.

That is, in the first place, according to the present invention, there is provided a separation membrane complex comprising a porous body and a separation membrane formed on a surface of the porous body; wherein the porous body has a substrate, an intermediate layer formed on the substrate, and a surface layer formed on the intermediate layer; and the separation membrane is formed directly on the surface layer of the porous body, and the intermediate layer has a thickness of 10 to 100 μm (referred to as the first separation membrane complex).

Then, according to the present invention, there is provided a separation membrane complex comprising a porous body and a separation membrane formed on a surface of the porous body; wherein the porous body has a substrate, an intermediate layer formed on the substrate, and a surface layer formed on the intermediate layer; and the separation membrane is formed directly on the surface layer of the porous body, and the intermediate layer is constituted of an aggregate having a primary particle which is smaller than an average pore diameter of the substrate (referred to as the second separation membrane complex).

In the present specification, when a separation membrane complex according to the present invention is simply referred to, it means both the first separation membrane complex and the second separation membrane complex.

In the first separation membrane complex according to the present invention, the intermediate layer has a thickness of preferably 10 to 50 μm.

In a separation membrane complex according to the present invention, "directly" means "without interposing anything". In a separation membrane complex according to the present invention, as in the Patent Document 1, a sol layer is not formed in separation membrane (carbon membrane) formation parts of a porous body. The surface layer is a layer located on the surface among the layers constituting the porous body and does not constitute a surface of the separation membrane complex since a separation membrane is formed thereon. Each of the intermediate layer and the surface layer may be a single layer or may be constituted of two or more layers.

A separation membrane complex according to the present invention is suitably used when the porous body has a monolith shape.

A separation membrane complex according to the present invention is suitably used when the separation membrane is a molecular sieve carbon membrane.

Next, according to the present invention, there is provided a ceramic filter constituted of any one of the aforementioned separation membrane complexes and capable of separating water and ethanol.

In addition, according to the present invention, there is provided a ceramic filter constituted of any one of the aforementioned separation membrane complexes and capable of separating a mixed gas or the like such as oxygen and nitrogen besides the aforementioned liquid mixture such as water and ethanol at a molecular level.

Next, according to the present invention, there is provided a method for manufacturing a separation membrane complex comprising a porous body and a separation membrane formed on a surface of the porous body, the method comprising: forming a substrate, forming an intermediate layer having a thickness of 10 to 100 µm on the substrate, and forming a surface layer on the intermediate layer to obtain the porous body; and forming the separation membrane directly on the surface layer of the porous body (referred to as the first method for manufacturing a separation membrane complex).

Next, according to the present invention, there is provided a method for manufacturing a separation membrane complex comprising a porous body and a separation membrane formed on a surface of the porous body, the method comprising: forming a substrate, forming an intermediate layer on the substrate with a particle (secondary particle) consisted of an aggregate having a primary particle which is smaller than an average pore diameter of the substrate, and forming a surface layer on the intermediate layer to obtain the porous body; and forming the separation membrane directly on the surface layer of the porous body (referred to as the second method for manufacturing a separation membrane complex).

In the present specification, when a method for manufacturing a separation membrane complex according to the present invention is simply referred to, it means both the first method for manufacturing a separation membrane complex and the second method for manufacturing a separation membrane complex.

In the first method for manufacturing a separation membrane complex according to the present invention, the intermediate layer formed has a thickness of more preferably 10 to 50 µm.

In a method for manufacturing a separation membrane complex according to the present invention, "to directly form a separation membrane" means "without interposing anything between the membrane and the surface layer of the porous body. In a separation membrane complex according to the present invention, as in the Patent Document 1, a sol layer is not formed in separation membrane (carbon membrane) formation parts of a porous body, that is, on a surface layer of a porous body.

A method for manufacturing a separation membrane complex according to the present invention can suitably be used when the porous body has a monolith shape.

A method for manufacturing a separation membrane complex according to the present invention can suitably be used when the separation membrane is a molecular sieve carbon membrane.

In the present specification, an aggregate means one forming a certain shape by aggregating the primary particles. This aggregate constitutes the secondary particle. A dense body means a fired article without any gap or pore due to the residue of inside gas. The dense body shows the concept as opposed to the porous article. The dense body constitutes the primary particle.

In the present specification, the pressure loss is a pressure loss K obtained by measuring the differential pressure $\Delta P$ (kfg/cm$^2$) when He gas is supplied at N (L/min) per 1 cm$^2$ of the membrane area and followed by substituting the differential pressure $\Delta P$ into the following formula.

Pressure loss $K=\Delta P/N$ (kgf·mm/L)

In the present specification, a separation coefficient among the indexes for the pervaporation separation performance of the separation membrane complex is a ratio of a permeation side liquid composition ratio to a supply side liquid composition ratio and water/ethanol separation coefficient $\alpha$ obtained by the following formula. In the following formula, Perm (water) and Perm (ethanol) show mass concentrations [mass %] of water and ethanol after permeating the membrane, respectively, and Feed (water) and Feed (ethanol) show mass concentrations (mass %) of water and ethanol in the supplied liquid, respectively.

Separation coefficient $\alpha$=(Perm (water)/Perm (ethanol))/(Feed (water)/Feed (ethanol))

In the present specification, flux (kg/m$^2$h) among the indexes for the pervaporation separation performance of the separation membrane complex is obtained by the following formula. In the following formula, Q shows a permeation liquid mass (kg), A shows an area (m$^2$) of the separation membrane, and t shows time (h).

Flux=$Q/(A\times t)$

The average pore diameter (µm) in the present specification is a value measured by mercury porosimetry. The average particle diameter (µm) is a value of a 50% particle diameter measured by an x-ray transmission type particle size distribution measurement apparatus (Sedigraph, model 5000-02, produced by Shimadzu Corporation in Examples described later).

In a separation membrane complex according to the present invention, a separation membrane is formed directly on (a surface layer of) a porous body and a sol layer does not provided. Therefore, selectivity is not deteriorated by the influence of a sol layer unlike the invention disclosed in the Patent Document 1. A separation membrane complex according to the present invention can exhibit high selectivity even for a system having a relatively small molecular weight such as $CO_2/CH_4$, $N_2/O_2$, water/EtOH, or the like having high industrial usability.

Since a separation membrane complex according to the present invention is not provided with a sol layer, increase in pressure loss due to the sol layer is not caused, and flux deterioration is not caused.

The first separation membrane complex according to the present invention has an intermediate layer having a thickness of 10 to 100 µm, which is thin. Therefore, a separation membrane complex according to the present invention has small total pressure loss and can obtain high flux.

The second separation membrane complex according to the present invention can suppress pressure loss because the intermediate layer is constituted of an aggregate. As a result, since permeability of permeable gas improves, the second separation membrane complex according to the present invention has high separation coefficient and high flux. According to the second separation membrane complex according to the present invention, for example, it is possible to obtain a (ceramic) filter having a separation coefficient $\alpha$ of 100 or more and a flux of 1 kg/m$^2$h or more in the evaluations performed by water-ethanol pervaporation separation method under the conditions of a water/ethanol (EtOH) ratio of 10/90 mass % and a supply liquid temperature of 75° C.

A method for manufacturing a separation membrane complex according to the present invention exhibits an excellent effect in that a separation membrane complex according to the present invention can be obtained.

Figure 1:
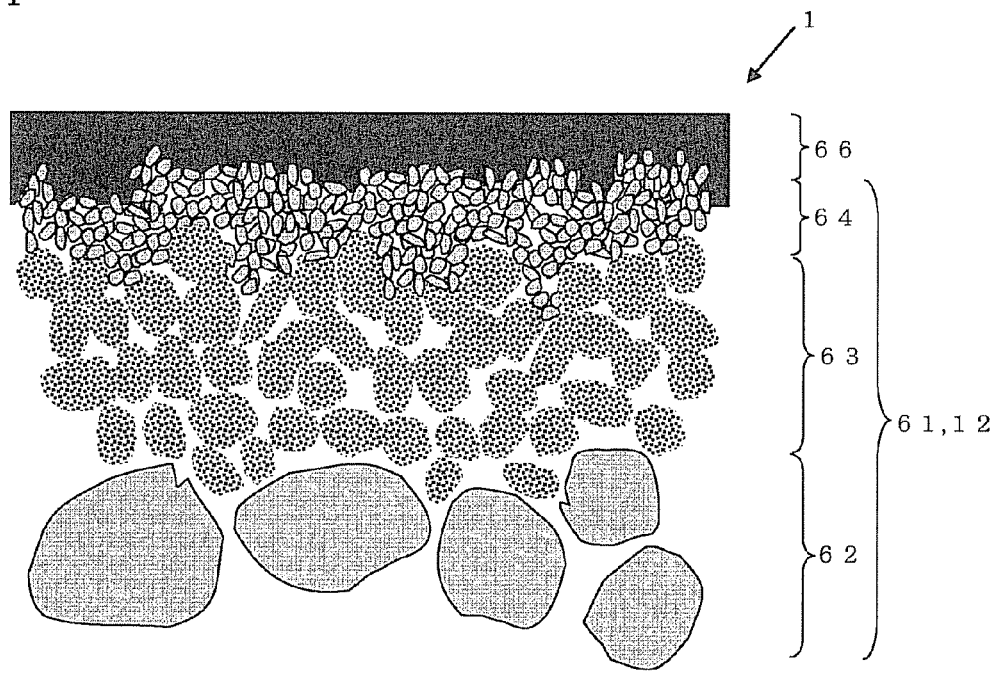
FIG. 1 is a view showing an embodiment of a separation membrane complex according to the present invention and schematic view showing an enlarged part of a cross section of an internal wall face of a cell.

DESCRIPTION OF REFERENCE NUMERALS 1 separation membrane complex
2 separation membrane complex
3 molecular sieve carbon membrane
12 partition wall
13 cell
15, 16 end face
17 peripheral face
51 porous body
53 intermediate layer
61 porous body
62 substrate
63 intermediate layer
64 surface layer
66 carbon membrane

BEST MODE FOR CARRYING OUT DETAILED DESCRIPTION OF THE INVENTION

Hereinbelow, regarding the present invention, embodiments will be described with referring to views as necessary. However, the present invention should not be construed with limiting to these embodiments. Various changes, modifications, improvements, and substitutions may be made on the basis of knowledge of a person of ordinary skill within the range of not impairing the gist of the present invention. For example, though the views show preferable embodiments of the present invention, the present invention is not limited by a mode shown in the views or information shown in the views. Upon carrying out or investigating the present invention, though there can be used the same means as or a means equivalent to that described in the present specification, a preferable means is the following means.

Figure 6:
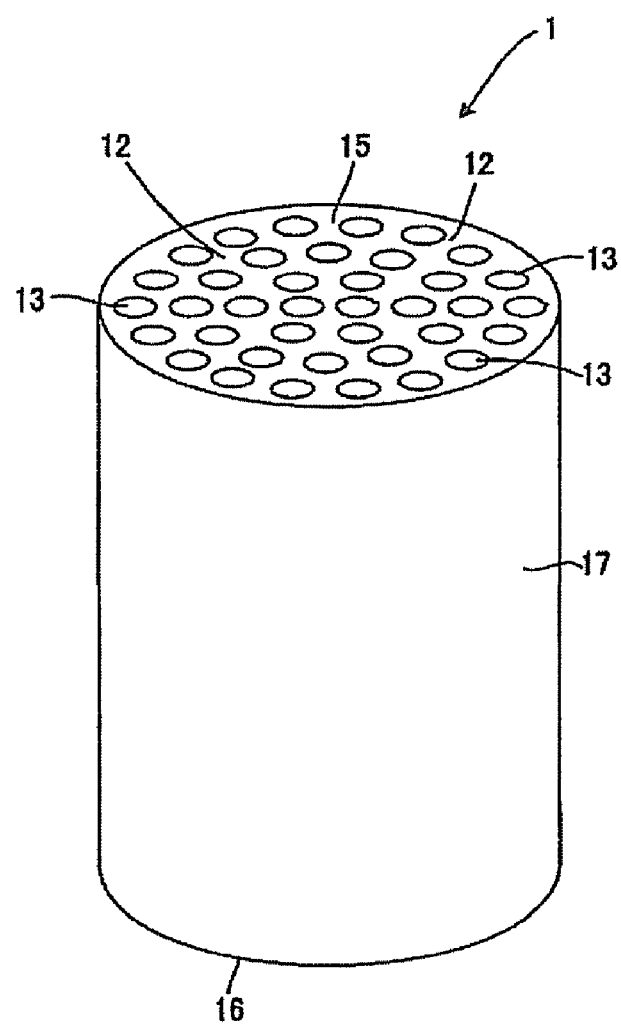
FIG. 6 is a view showing an embodiment of a separation membrane complex according to the present invention and perspective view showing the whole.

In the first place, a separation membrane complex according to the present invention will be described. FIGS. 1 and 6 are views showing an embodiment of a separation membrane complex according to the present invention. FIG. 6 is a perspective view showing the whole, and FIG. 1 is a schematic view showing an enlarged part of a cross section of an internal wall face of a cell.

The separation membrane complex 1 shown in FIGS. 1 and 6 has a columnar outer shape as a whole (see FIG. 6) and has a monolith shape (lotus root-like shape) having a plurality of cells 13 constituting fluid passages in the axial direction (of the column). The cells 13 separated by partition walls 12 which is a porous body 61, for example, has a circular cross section perpendicular to the axial direction, and a carbon membrane 66 is formed on the internal wall faces of the cells 13 (see FIG. 1). The internal wall face means a surface of the partition walls 12 which are substantial parts forming the cells 13 serving as spaces.

In the separation membrane complex 1, for example, when a mixture of water and ethanol as a target substance for separation is introduced into the cells 13 from the end face 15 on the inlet side, water as a substance constituting the mixture is selectively separated in the carbon membrane 66 formed on the internal wall faces of the cells 13 until the mixture reaches the end face 16 on the outlet side, passes through the partition walls 12, and is discharged from the outermost peripheral face 17 of the separation membrane complex 1. That is, the mixture can be separated into water as a substance and ethanol as another substance, and the separation membrane complex 1 can be used as a filter having a high separation property for (for example) water and ethanol.

As shown in FIG. 1, the separation membrane complex 1 is a complex having a porous body 61 (partition walls 12) and a carbon membrane 66 as a separation membrane formed on surface of the porous body 61 (partition walls 12). Further, the porous body 61 is constituted of a substrate 62 having an average particle diameter of 10 to 100 μm and an average pore diameter of 1 to 30 μm, an intermediate layer 63 which has a thickness of 10 to 100 μm and an average pore diameter of 0.1 to 3 μm and is constituted of an aggregate having a primary particle smaller than the average pore diameter of the substrate, and a surface layer 64 having a thickness of 1 to 100 μm and an average pore diameter of 0.01 to 0.5 μm from inside. In addition, without forming a sol layer, a carbon membrane 66 as a separation membrane is formed directly on (the surface of) the surface layer 64.

Figure 2:
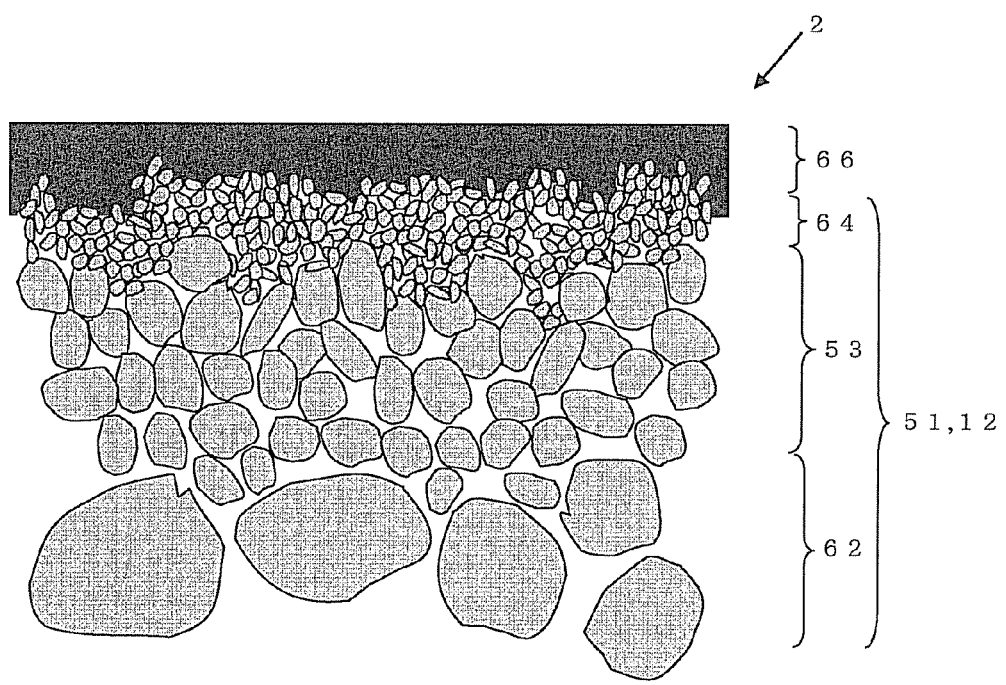
FIG. 2 is a view showing the other embodiment of a separation membrane complex according to the present invention and schematic view showing an enlarged part of a cross section of an internal wall face of a cell.
Figure 3:
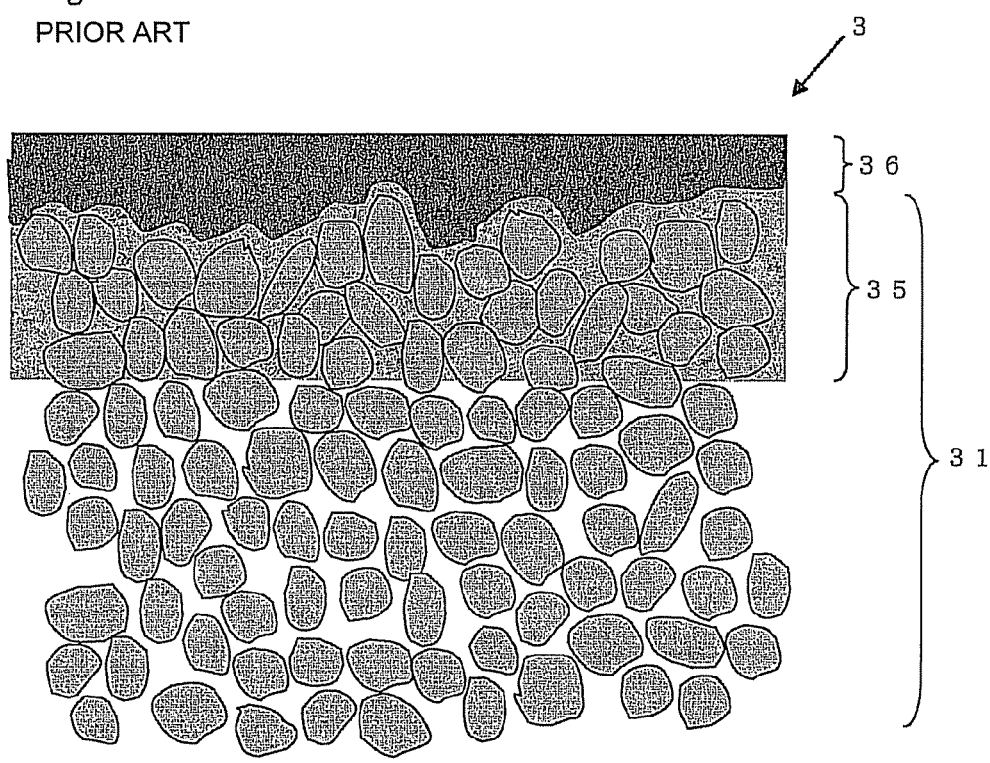
FIG. 3 is a view showing an example of a conventional separation membrane complex having a sol layer and schematic view showing an enlarged part of a cross section of an internal wall face of a cell.

FIG. 2 is a view showing the other embodiment of a separation membrane complex according to the present invention and schematic view showing an enlarged part of a cross section of an internal wall face of a cell similarly to FIG. 1. The separation membrane complex 2 shown in FIG. 2 is different from the separation membrane complex 1 shown in FIG. 1 in that the intermediate layer constituting the porous body 51 is the intermediate layer 53 constituted of a dense body. The others are the same as in the separation membrane complex 1, and therefore the explanations are omitted.

Next, a method for manufacturing a separation membrane complex according to the present invention will be described by the use of the case of manufacturing the aforementioned separation membrane complex 1 as an example. In the first place, a substrate 62 constituting the porous body 61 is obtained, and it can be performed by a well-known means. For example, a monolith-shaped substrate 62 can be obtained by the use of a porous material, which is subjected to extrusion forming to obtain a formed article, followed by firing. Then, a membrane is formed on a surface of the substrate 62 by a filtration membrane-forming method with using ceramic particles consisted of an aggregate (or a dense body) and adjusting the thickness of the membrane after firing to be 10 to 500 μm (10 to 100 μm in the case of the dense body) by controlling the time for forming the membrane, followed by firing to form an intermediate layer 63. Further, a membrane is formed on the intermediate layer 63 by a filtration membrane-forming method with using ceramic particles having an average particle diameter of 0.03 to 1 μm, followed by firing to form a surface layer 64, and thereby a porous body 61 can be obtained. The position for forming the intermediate layer 63 and the surface layer 64 in a surface of the substrate 62 is on the internal wall faces of the cells 13.

As the porous material (material for the ceramic particles) for the substrate 62, for example, alumina can be used from the viewpoints that corrosion resistance, little change in pore diameter due to temperature change, and sufficient strength obtained, and, besides it, cordierite, mullite, silicon carbide, titania, or the like, can be used.

As the porous material (material for the ceramic particles) for the intermediate layer 63 and the surface layer 64, a material similar to that for the substrate 62 can be used. As (for example) the alumina particles forming the intermediate layer 63, there can be used particles having a small average particle diameter in comparison with (for example) the alumina particle forming the substrate 62 having the average particle diameter of 10 to 100 μm, for example, particles having an average particle diameter of 0.3 to 10 μm. There are used alumina particles (for example) forming the surface layer 64 and having a small average particle diameter in comparison with the alumina particle (for example) forming the intermediate layer 63, for example, particles having an average particle diameter of 0.03 to 1 μm. In the case of forming the intermediate layer 63 and the surface layer 64 by a filtration membrane-forming method, each porous material is used as slurry obtained by mixing framework particles consisted of alumina particles or the like having a desired average particle diameter, a sintering auxiliary consisted of a glass frit powder or the like, and a binder in a solvent such as water or the like at a predetermined rate. The rate of content of the binder with respect to the content of the inorganic fraction constituting the slurry is desirably 2 to 10 mass %.

Next, a carbon membrane 66 (separation membrane) is formed on a surface of the porous body 61 (surface of the surface layer 64) obtained above. The position for forming the carbon membrane 66 in a surface of the porous body 61 is on the internal wall faces, where the intermediate layer 63 and the surface layer 64 are previously formed, of the cells 13 and on surfaces of the partition walls 12. The carbon membrane 66 is formed on a surface of the porous body 61 by bringing a precursor solution which forms the carbon membrane 66 later into contact with the surface of the porous body 61. The membrane formation (deposition of the precursor solution and drying) may be performed once or divided into plural times. Then, carbonization is performed at about 500 to 900° C., preferably about 700° C. under a nitrogen atmosphere to form the membrane. The carbonization may be performed under a vacuum state or under an inert atmosphere of argon, helium, or the like besides a nitrogen atmosphere. When carbonization is performed at a temperature below 500° C., carbonization may be insufficient, and selectivity and permeation rate may be lowered as a molecular sieve membrane. On the other hand, when carbonization is performed at a temperature above 900° C., the pore diameter is contracted, and therefore, the permeation rate may fall off.

As a means to bring the precursor solution into contact with a surface of the porous body 61 in order to form a carbon membrane 66, there may be employed a means such as immersion, spin coat, spray coating or the like. When the porous body has a monolith shape as in the present embodiment, employment of immersion enables to form a carbon membrane easily. The precursor solution serving as a carbon membrane 66 is a solution obtained by mixing and dissolving a thermosetting resin such as phenol resin, melamine resin, urea resin, furan resin, polyimide resin, epoxy resin, or the like; a thermoplastic resin such as polyethylene or the like; a cellulosic resin or the like; or a precursor substance of these resins in an organic solvent such as methanol, acetone, THF, NMP, toluene, or the like; water; or the like. When a membrane is formed by the use of the precursor solution, an appropriate thermal treatment may be performed in accordance with the kind of the resin contained therein.

EXAMPLE

Hereinbelow, the present invention will be described in more detail on the basis of Examples. However, the present invention is by no means limited to these Examples.

Example 1

A monolith-shaped substrate having an average particle diameter of 10 to 100 μm and an average pore diameter of 1 to 30 μm was manufactured by means of forming by extrusion forming and firing. Next, the alumina particles (secondary particles) which is constituted of an aggregate having a primary particle diameter of 0.01 to 1 μm and which has an average particle diameter of 0.3 to 10 μm were deposited on the internal wall faces of the cells in the substrate obtained above by a filtration membrane-forming method with adjusting the membrane thickness by the membrane formation time, followed by firing to form an intermediate layer having a thickness of 10 μm and the average pore diameter of 0.1 to 3 μm. Then, on the intermediate layer, alumina particles having an average particle diameter of 0.03 to 1 μm were deposited by a filtration membrane-forming method with adjusting the membrane thickness by the membrane formation time, followed by firing to form a surface layer having a thickness of 10 μm and an average pore diameter of 0.01 to 0.5 μm. Thus, a porous body was obtained.

Next, by the immersion method, a membrane was formed on the internal wall faces of the cells in the porous body by repeating deposition and drying three times using a carbon membrane precursor solution and then carbonized at 700° C. under a nitrogen atmosphere to further form a carbon membrane on the surface layer. Thus, a separation membrane complex was obtained.

The separation membrane complex obtained above was evaluated by a water-ethanol pervaporation separation method. As the test conditions, the water/ethanol (EtOH) ratio was 10/90 mass %, and the temperature of the supplied liquid was 75° C. Table 1 shows the particle form (aggregate or dense body) of the intermediate layer, thickness of the intermediate layer, the pervaporation separation performance (separation coefficient, flux), and pressure loss.

Example 2

Figure 4:
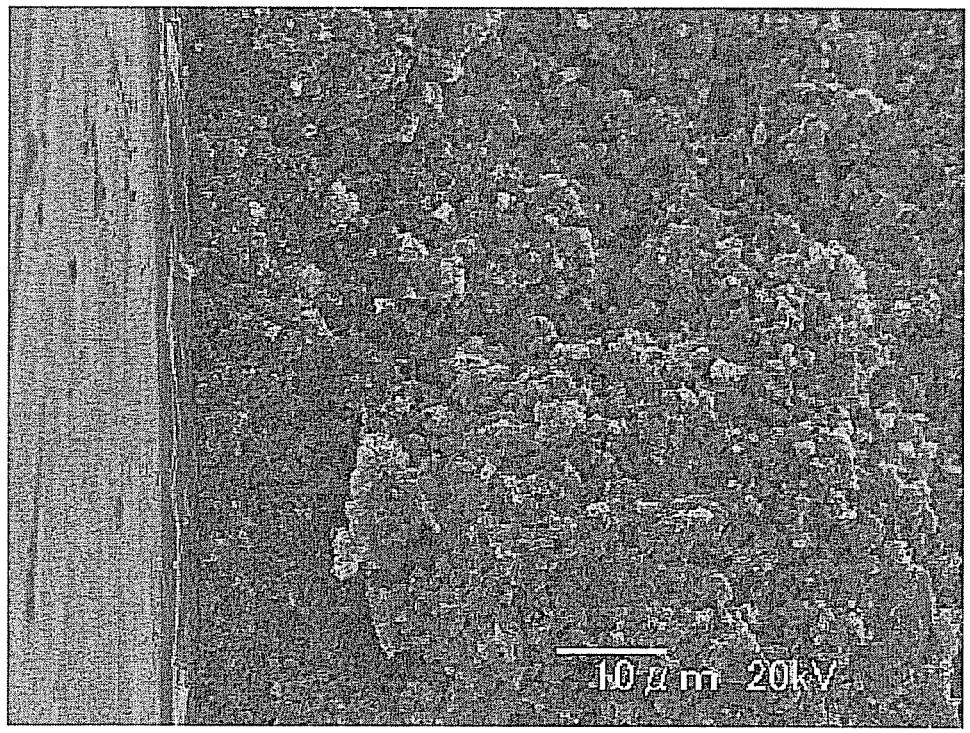
FIG. 4 is a photograph showing a cross section of a porous body in Example 2.

A separation membrane complex was manufactured in the same manner as in Example 1 except that the thickness of the intermediate layer was made to be 100 μm and evaluated by the water-ethanol pervaporation separation method under the same conditions as in the Example 1. Table 1 shows the particle form (aggregate or dense body) of the intermediate layer, thickness of the intermediate layer, the pervaporation separation performance (separation coefficient, flux), and pressure loss. In addition, FIG. 4 shows a photograph of a cross section of the porous body after the carbon membrane was formed. In Example 2, two porous bodies were manufactured under the same conditions, and FIG. 4 is a photograph of a cross section of one of the porous bodies.

Example 3

A separation membrane complex was manufactured in the same manner as in Example 1 except that alumina particles constituted of a dense body were used upon forming the intermediate layer and that the thickness of the intermediate layer was made to be 50 μm and evaluated by the water-ethanol pervaporation separation method under the same conditions as in the Example 1. Table 1 shows the particle form (aggregate or dense body) of the intermediate layer, thickness of the intermediate layer, the pervaporation separation performance (separation coefficient, flux), and pressure loss.

Example 4

A separation membrane complex was manufactured in the same manner as in Example 1 except that the thickness of the intermediate layer was made to be 500 μm and evaluated by the water-ethanol pervaporation separation method under the same conditions as in the Example 1. Table 1 shows the particle form (aggregate or dense body) of the intermediate layer, thickness of the intermediate layer, the pervaporation separation performance (separation coefficient, flux), and pressure loss.

Comparative Example 1

Figure 5:
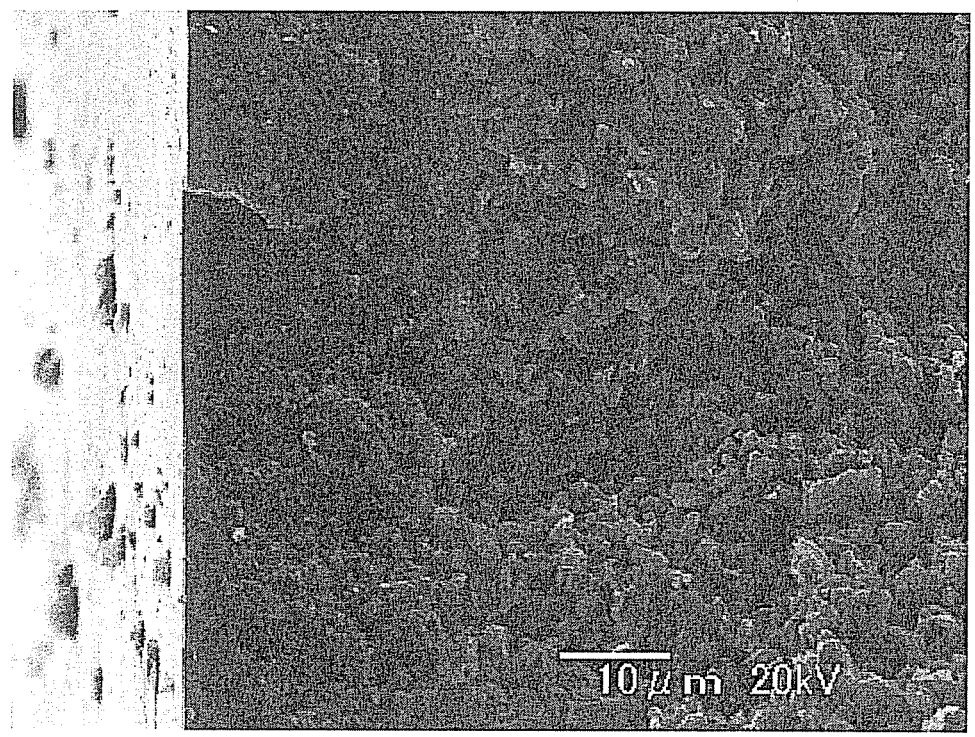
FIG. 5 is a photograph showing a cross section of a porous body in Comparative Example 1.

A separation membrane complex was manufactured in the same manner as in Example 1 except that alumina particles constituted of a dense body were used upon forming the intermediate layer and that the thickness of the intermediate layer was made to be 500 μm and evaluated by the water-ethanol pervaporation separation method under the same conditions as in the Example 1. Table 1 shows the particle form (aggregate or dense body) of the intermediate layer, thickness of the intermediate layer, the pervaporation separation performance (separation coefficient, flux), and pressure loss. In addition, FIG. 5 shows a photograph of a cross section of the porous body after the carbon membrane was formed. In Comparative Example 1, two porous bodies were manufactured under the same conditions, and FIG. 5 is a photograph of a cross section of one of the porous bodies.

TABLE 1

| | Particle form of intermediate layer | Thickness of intermediate layer (μm) | Separation coefficient α Water/EtOH | Flux (kg/ $m^2h$) | Pressure loss (kgf · min/L) |
|---|---|---|---|---|---|
| Example 1 | Aggregate | 10 | 160 | 1.6 | 0.7 |
| Example 2 | Aggregate | 100 | 100 | 1 | 1.2 |
| Example 3 | Dense body | 50 | 100 | 0.8 | 1.4 |
| Example 4 | Aggregate | 500 | 90 | 0.8 | 1.5 |
| Comp. Ex. 1 | Dense body | 500 | 40 | 0.2 | 3.2 |

(Discussion)

As shown by the results of Examples 1 to 4 of Table 1, a good separation performance was imparted to the separation membrane complexes whose intermediate layers had a thickness of 10 to 100 μm. In addition, separation membrane complexes using alumina particles consisted of an aggregate upon forming the intermediate layer exhibited good separation performance. It is clear in comparison with the separation performance of the separation membrane complex (Comparative Example 1) which has an intermediate layer using alumina particle consisted of a dense body and having a thickness of above 100 μm.

From the results of Examples 1 and 2, it can be understood that, in the case that alumina particles consisted of an aggregate is used upon forming the intermediate layer, both the separation coefficient α and flux (pressure loss) can be improved by reducing the thickness of the intermediate layer. This seems to be because permeability of permeable gas is improved by reducing the thickness of the intermediate layer.

INDUSTRIAL APPLICABILITY

A separation membrane complex of the present invention can widely be used as a filter selectively separating a specific substance (gas or the like) from a mixture of a plurality of substances (gas or the like), or the like.

The invention claimed is:

1. A separation membrane complex comprising a porous body and a separation membrane formed on a surface of the porous body;
    wherein the porous body has a substrate, an intermediate layer formed on the substrate, and a surface layer formed on the intermediate layer, the intermediate layer having a thickness of 10 to 100 μm and being constituted of secondary particles formed of aggregated primary particles, the primary particles being smaller than an average pore diameter of the substrate; and
    wherein the separation membrane is formed directly on the surface layer of the porous body.

2. A separation membrane complex according to claim 1, wherein the porous body has a monolith shape.

3. A separation membrane complex according to claim 1, wherein the separation membrane is a molecular sieve carbon membrane.

4. A ceramic filter constituted of a separation membrane complex according to claim 3 and capable of separating water and ethanol.

5. A separation membrane complex according to claim 2, wherein the separation membrane is a molecular sieve carbon membrane.

6. A ceramic filter constituted of a separation membrane complex according to claim 5 and capable of separating water and ethanol.

7. A method for manufacturing a separation membrane complex comprising a porous body and a separation membrane formed on a surface of the porous body, the method comprising:
    forming a substrate, forming an intermediate layer on the substrate, the intermediate layer having a thickness of 10 to 100 μm and being formed of secondary particles formed of aggregated primary particles, the primary particles being smaller than an average pore diameter of the substrate, and forming a surface layer on the intermediate layer to obtain the porous body; and
    forming the separation membrane directly on the surface layer of the porous body.

8. A method for manufacturing a separation membrane complex according to claim 7, wherein the porous body has a monolith shape.

9. A method for manufacturing a separation membrane complex according to claim 7, wherein the separation membrane is a molecular sieve carbon membrane.

10. A method for manufacturing a separation membrane complex according to claim 8, wherein the separation membrane is a molecular sieve carbon membrane.

* * * * *